(No Model.) 2 Sheets—Sheet 2.
W. A. C. OAKS.
FRUIT PARER AND CORER.
No. 449,050. Patented Mar. 24, 1891.
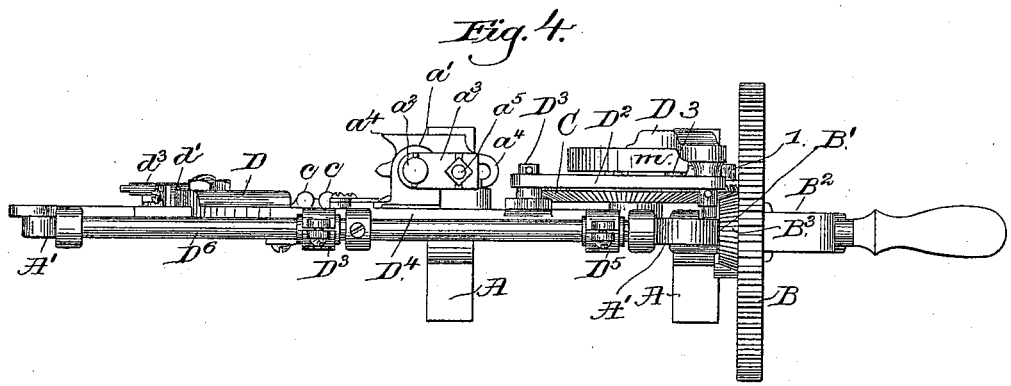
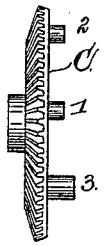
Witnesses.
John F. C. Parinkerk
Geo. C. Hunting
Inventor:
William A.C. Oaks.
by Lensby & Gregory Attys.

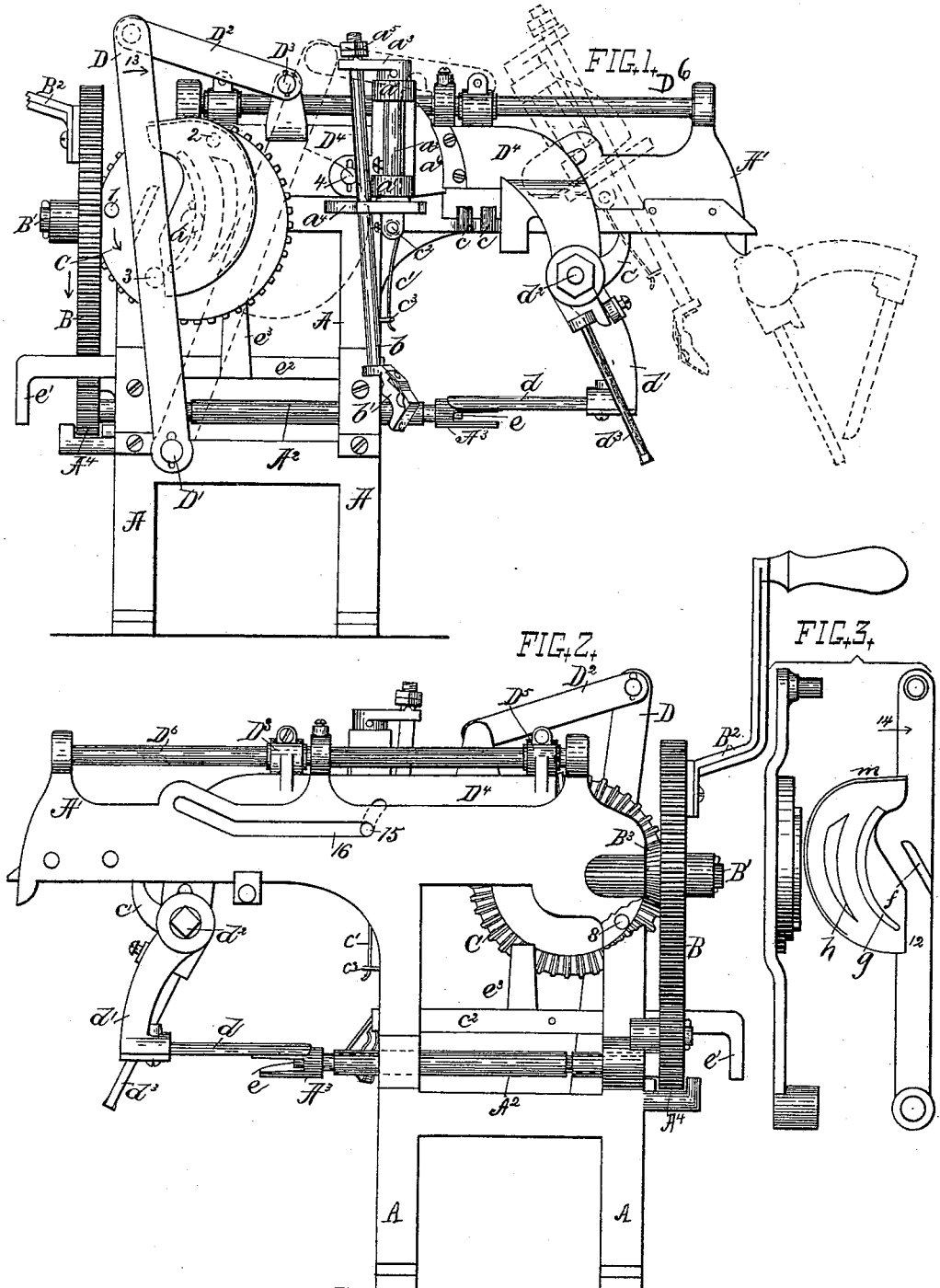

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

FRUIT PARER AND CORER.

SPECIFICATION forming part of Letters Patent No. 449,050, dated March 24, 1891.

Application filed June 20, 1890. Serial No. 356,125. (No model.)

*To all whom it may concern:*

Be it known that I, WILLIAM A. C. OAKS, of Antrim, county of Hillsborough, State of New Hampshire, have invented an Improvement in Fruit Parers and Corers, of which the following description, in connection with the accompanying drawings, is a specification, like letters and figures on the drawings representing like parts.

This invention has for its object to improve and simplify the construction of apparatus designed to pare fruit and to core the same in case of apples, &c.

The chief aim of this invention is to provide novel means whereby the carrier upon which is mounted the rod carrying the paring-blade may be moved at variable speed—that is, moved very quickly to place the paring-blade in position to enable the fruit to be put upon the fork, and then to bring the paring-blade up to the fruit to be pared, the movement of the carrier thereafter being slower while the paring-blade acts to pare the fruit.

In accordance with this invention the carrier referred to is mounted upon a carriage connected in suitable manner, as by link, to a radius-bar having a series of surfaces which are acted upon one after the other or in proper succession by means of pins or projections, herein shown as of varying length and extended from one side of a gear, the said pins being located at different distances from the center of rotation of the said gear.

Figure 1 in side elevation represents a fruit-parer embodying my invention, the full lines showing the paring blade or knife in its position at the rear of the fork, the dotted lines showing the said blade or knife in its position farthest from the fork, the shape of the cams of the radius-bar being represented by dotted lines. Fig. 2 is a rear side elevation of the apparatus shown in Fig. 1; Fig. 3, details showing the radius-bar and its attached projections in two different positions. Fig. 4 is a top or plan view of the machine shown in Fig. 1, and Fig. 5 is an edge view of the beveled gear C detached.

The frame-work consists, essentially, of uprights A and a horizontal extension A'. The uprights have suitable bearings for the hollow shaft $A^2$, upon the front end of which is fixed the fork $A^3$, the rear end of the shaft having a pinion $A^4$, which is engaged and rotated by a toothed gear B, mounted upon the stud B', fixed to the frame-work, the said gear having a suitable handle $B^2$ and being provided at its inner side with a suitable bevel-pinion $B^3$. The bevel-pinion $B^3$ engages a bevel-gear C, mounted upon a suitable stud $a$ of the frame-work, the said gear having at its outer side a series of studs 1 2 3, (see Fig. 5,) the studs 1 and 2 being nearer the periphery of the wheel of the said gear than the stud 3, it being longer than the studs 1 and 2. Each stud does its own particular work in the movement of the radius-bar D about its fulcrum D'. The upper end of this radius-bar is connected, as herein shown, by a link $D^2$ to a stud $D^3$ on the ear of a carriage $D^4$, the said carriage having suitable socketed or eyed holes $D^5$, which embrace and slide upon a fixed guide-rod $D^6$ as the said radius-bar is vibrated, as will be described.

The carriage $D^4$ has pivoted on it at 4 a carrier $a^6$, having suitable bearings $a'$, through which is extended a rock-shaft $a^2$, having at its upper end an arm $a^3$ and at its lower end an arm $a^4$, provided with a suitable slot, through which is extended the rod $b$, to the lower end of which is attached the usual knife $b'$, having a blade to pare the fruit. The rod $b$ at its upper end is extended through a slot in the arm $a^3$, and is then provided with suitable nuts, as $a^5$, which sustain the weight of the rod and knife. The arm $a^4$ at its inner end has in practice three teeth, which in the reciprocation of the carriage with the carrier engage the two stationary teeth $c\ c'$ on the overhanging part A' of the frame and cause the partial rotation or oscillation of the rod $b$ to carry the knife about the fruit to be pared in usual manner. A spring $c'$, connected at one end to a rod $c^2$, having bearings in the arm $a^4$ and entering at its other end an eye $c^3$ on the rod $b$, keeps the blade of the knife pressed against the fruit in a yielding manner during the paring operation.

The corer $d$ and the arm $d'$, to which it is connected, said arm being pivoted at $d^2$ on the carriage $D^4$, are and may be of usual construction, as may also be the finger $d^3$, cooperating with the corer to discharge the apple from said corer.

The hollow shaft $A^2$ contains a core-discharger $e$, made as a rod, extended through the said shaft, and having at its outer end a small head, which is acted upon by the downturned end $e'$ of a slide-bar $e^2$, having a projection $e^3$, the movement of which toward the right in Fig. 1 will cause the core-discharger to be thrown forward, as in the said figure, to discharge the core.

Placing the apple upon the fork pushes the core-discharger back somewhat, together with the slide-bar $e^2$, and after the paring of the fruit is completed a projection 8 upon the rear side of the wheel (shown by dotted lines in Fig. 2) strikes the arm $e^3$ and effects the forward movement of the core-discharger.

Referring now to Figs. 1 and 3, it will be seen that the radius-bar D has three cam projections—viz., $f$, $g$, and $h$—of somewhat different shape, two of the said projections—viz., $f$ and $g$—being upon a sort of wing extended from the said radius bar, which wing, as shown, has an internal projecting rib $m$ at its edge.

In the operation of the apparatus, it being supposed that the parts are as in Fig. 1, and that the fruit to be pared is upon the fork, the rotation of the gears B and C in the direction of the arrow thereon will first cause the stud 3, which is the longest one and which is also nearer the center of rotation of the gear C, to strike the surface 12 and move the radius-bar quickly in the direction of the arrow 13 thereon to quickly throw the carriage $D^4$ forward and place the knife in its dotted-line position, by which time the said stud 3 arrives in contact with the inner side of the projection $f$, which causes the radius-bar to be moved backwardly far enough to place the blade substantially in paring position or against the fruit to be pared, at which time the quick motions of the carriage and the carrier upon which is mounted the knife are completed. Now in the further rotation of the gear or wheel C the stud 1 acts against the left-hand side (see Fig. 3) of the projection $g$ and continues the movement of the radius-bar in the direction of the arrow 14 thereon, causing the knife to travel about the fruit on the fork and toward the base of the fork, the stud 2 coming against the left-hand side of the projection $h$ about as the stud 3 leaves the projection $g$, thus keeping up at a slower speed the movement of the radius-bar until the knife has completed the paring operation, at which time, as before stated, the stud 8 meets the projection $e^3$ and causes the core-discharger to be moved forward.

The carriage $D^4$ has a slot, as shown by dotted lines in Fig. 2, through which is extended a pin 15, connected to the inner side of the carriage $a^6$, which contains the shaft $a^2$, the said pin entering a cam-slot 16 in the horizontally-extending arm $A'$, the said pin traveling in the said slot when the carriage is moving outwardly, causing the carrier to be tipped from its full-line into its dotted-line position, Fig. 1.

The present invention is an improvement upon that represented in United States Patent No. 397,871, granted to me February 12, 1889. In that patent I employed an arm having a cam-slot which was actuated by a pin on a rotating arm or crank. In the present invention the construction and location of the lever for actuating the carriage with relation to the carrier enables me to dispense with a number of parts which were employed in the patented machine, and the addition of the series of projections to the rear side of the lever D, which projections are acted upon by the series of pins carried by the lever D, which is simply a vibrating lever, enables me to better actuate the carriage and to gain increased speed at the time that increased speed is needed.

I claim—

The sliding carriage to support a carrier containing the paring-knife, a radius-bar having a series of cam projections, and means to connect the said radius-bar and carriage, combined with a rotating wheel having studs of different lengths, substantially as described, to act upon the different projections of the radius-bar and impart fast and slow movements to the carriage at desired times, as and for the purpose set forth.

In testimony whereof I have signed my name to this specification in the presence of two subscribing witnesses.

WILLIAM A. C. OAKS.

Witnesses:
H. A. HURLIN,
M. J. ABBOTT.